United States Patent
Nakata (10) Patent No.: US 11,037,062 B2
(45) Date of Patent: Jun. 15, 2021

(54) LEARNING APPARATUS, LEARNING METHOD, AND LEARNING PROGRAM

(71) Applicant: KABUSHIKI KAISHA TOSHIBA, Tokyo (JP)

(72) Inventor: Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 893 days.

(21) Appl. No.: 15/420,834

(22) Filed: Jan. 31, 2017

(65) Prior Publication Data

US 2017/0270412 A1    Sep. 21, 2017

(30) Foreign Application Priority Data

Mar. 16, 2016  (JP) .............................. JP2016-053038

(51) Int. Cl.
*G06N 5/02*    (2006.01)
(52) U.S. Cl.
CPC .................................. *G06N 5/025* (2013.01)
(58) Field of Classification Search
CPC ..................................................... G06N 5/025
See application file for complete search history.

(56) References Cited

U.S. PATENT DOCUMENTS

| | | | |
|---|---|---|---|
| 4,912,063 A | 3/1990 | Davis et al. | |
| 8,316,001 B1 | 11/2012 | Albrecht et al. | |
| 8,566,360 B2 | 10/2013 | Chen | |
| 8,645,391 B1 | 2/2014 | Wong et al. | |
| 9,898,464 B2 | 2/2018 | Okamoto et al. | |
| 10,444,742 B2 | 10/2019 | Orihara et al. | |
| 2002/0002567 A1 | 1/2002 | Kanie et al. | |

(Continued)

FOREIGN PATENT DOCUMENTS

| | | | |
|---|---|---|---|
| JP | H 06-243132 A | 9/1994 | |
| JP | H 07-334574 A | 12/1995 | |

(Continued)

OTHER PUBLICATIONS

U.S. Appl. No. 15/260,759, filed Sep. 9, 2016, Miyamura et al.

(Continued)

*Primary Examiner* — Li B. Zhen
*Assistant Examiner* — Selene A. Haedi
(74) *Attorney, Agent, or Firm* — Knobbe, Martens, Olson & Bear, LLP (57) ABSTRACT

According to one embodiment, a learning apparatus includes a first rule generator, a feature value calculator, a related word extractor, a second rule generator, and a learning unit. The first rule generator generates a first rule to label the event candidate, the first rule including a keyword of the event candidate. The feature value calculator calculates feature values of other words included in the text other than the event candidate. The related word extractor extracts a related word relating to the keyword from the other words using the feature values. The second rule generator generates a second rule to label the event candidate, the second rule being different from the first rule and including the related word. The learning unit generates learning data associating the keyword, the related word, and labeled event candidate with each other.

10 Claims, 12 Drawing Sheets

(56) References Cited

U.S. PATENT DOCUMENTS

| | | | |
|---|---|---|---|
| 2003/0004902 A1* | 1/2003 | Yamanishi | G06N 5/025 706/1 |
| 2005/0144177 A1 | 6/2005 | Hodes | |
| 2005/0160086 A1 | 7/2005 | Haraguchi et al. | |
| 2005/0251738 A1 | 11/2005 | Hirano et al. | |
| 2006/0112040 A1* | 5/2006 | Oda | G06Q 10/10 706/20 |
| 2006/0282442 A1 | 12/2006 | Lennon et al. | |
| 2007/0005344 A1* | 1/2007 | Sandor | G06F 16/35 704/9 |
| 2007/0073653 A1 | 3/2007 | Raab | |
| 2009/0077122 A1 | 3/2009 | Fume et al. | |
| 2009/0112642 A1 | 4/2009 | Uekane et al. | |
| 2009/0265160 A1 | 10/2009 | Williams et al. | |
| 2010/0063948 A1 | 3/2010 | Virkar | |
| 2010/0076991 A1 | 3/2010 | Nakano et al. | |
| 2010/0114561 A1* | 5/2010 | Yasin | G06F 16/355 704/9 |
| 2010/0145678 A1* | 6/2010 | Csomai | G06F 17/241 704/9 |
| 2011/0078098 A1* | 3/2011 | Lapir | G06F 16/35 706/12 |
| 2011/0264691 A1* | 10/2011 | Migita | G06Q 90/20 707/769 |
| 2012/0030157 A1 | 2/2012 | Tsuchida et al. | |
| 2012/0197826 A1 | 8/2012 | Mineno | |
| 2013/0013291 A1 | 1/2013 | Bullock et al. | |
| 2013/0029478 A1 | 1/2013 | Zhang et al. | |
| 2013/0066912 A1 | 3/2013 | Chetuparambil et al. | |
| 2013/0076751 A1 | 3/2013 | Jung et al. | |
| 2013/0086094 A1 | 4/2013 | Lundberg | |
| 2013/0173257 A1* | 7/2013 | Rose | G06F 17/277 704/9 |
| 2013/0179381 A1 | 7/2013 | Kawabata et al. | |
| 2013/0246048 A1 | 9/2013 | Nagase et al. | |
| 2014/0032513 A1 | 1/2014 | Gaither | |
| 2014/0372257 A1 | 12/2014 | Nishioka | |
| 2015/0058309 A1* | 2/2015 | Cho | G06F 16/9535 707/706 |
| 2016/0055196 A1 | 2/2016 | Collins et al. | |
| 2016/0140389 A1 | 5/2016 | Okamoto et al. | |
| 2017/0075877 A1 | 3/2017 | Lepeltier | |
| 2017/0091289 A1 | 3/2017 | Ohazulike et al. | |
| 2017/0124067 A1 | 5/2017 | Okamoto et al. | |
| 2018/0137435 A1 | 5/2018 | Okamoto et al. | |

FOREIGN PATENT DOCUMENTS

| | | | |
|---|---|---|---|
| JP | H 09-325962 A | 12/1997 | |
| JP | H 11-167576 A | 6/1999 | |
| JP | 2001-134600 A | 5/2001 | |
| JP | 2002-024211 A | 1/2002 | |
| JP | 2002-056354 A | 2/2002 | |
| JP | 2003-044481 A | 2/2003 | |
| JP | 2003-167870 A | 6/2003 | |
| JP | 2004-126903 A | 4/2004 | |
| JP | 2005-100082 A | 4/2005 | |
| JP | 2005-190338 A | 7/2005 | |
| JP | 2006-065387 A | 3/2006 | |
| JP | 2010-205218 A | 9/2010 | |
| JP | 2010-218209 A | 9/2010 | |
| JP | 4565106 B2 | 10/2010 | |
| JP | 2011-108085 A | 6/2011 | |
| JP | 2013-073619 A | 4/2013 | |
| JP | 2013-105321 A | 5/2013 | |
| JP | 2013-143039 A | 7/2013 | |
| JP | 2013-196374 A | 9/2013 | |
| JP | 5341276 B1 | 11/2013 | |
| JP | 5356197 B2 | 12/2013 | |
| JP | 2014-106611 A | 6/2014 | |
| JP | 2014-137722 A | 7/2014 | |
| JP | 2016-099741 A | 5/2016 | |
| JP | 2017-091000 A | 5/2017 | |
| WO | WO 2010/119615 A1 | 10/2010 | |
| WO | WO 2014/081012 A1 | 5/2014 | |

OTHER PUBLICATIONS

U.S. Appl. No. 15/343,914, filed Nov. 4, 2016, Okamoto et al.
U.S. Appl. No. 15/392,424, filed Dec. 28, 2016, Orihara et al.
Milkov Thomas, et al. "Efficient Estimation of Word Representations in Vector Space", arXiv:1301.3781, Sep. 2013.
Ciravegna, F., "Adaptive Information Extraction from Text by Rule Induction and Generalisation", Proceedings of IJACI-2001.

* cited by examiner

| Document ID | Text ID | Text |
|---|---|---|
| ... | ... | ... |
| 120 | 14@120 | Chronic/rheumatism/is/a/disease/accompanied/with/chronic/arthritis/,/and/has/a/prevalence/occupying/approximately/1/%/of/the/population/. |
| 120 | 15@120 | Human/BTLA/gene/has/already/been/subjected/to/cloning/by/the/prevent/inventors/from/Caucasian/derived/cell/,/and/its/base/sequence/is/known/. |
| ... | ... | ... |

FIG. 3

| Extraction method | Event content |
|---|---|
| Perfect matching | Rheumatism |
| Perfect matching | Colorectal cancer |
| Regular expression | Chronic {k*} |
| Regular expression | {K} Cancer |
| ... | ... |

FIG. 4

| Event ID | Event candidate |
|---|---|
| 2@14@120 | Rheumatism |
| 12-13@53@150 | Colorectal cancer |
| 1-2@14@120 | Chronic rheumatism |
| 16-17@41@160 | Other cancers |
| ... | ... |

FIG. 5

| Text ID | Event candidate | Text |
|---|---|---|
| 14@120 | Rheumatism | Chronic/rheumatism/is/a/disease/accompanied/with/chronic/arthritis/,/and/has/a/prevalence/occupying/approximately/1/%/of/the/population/. |

141

[+] When keyword [ ] exists within [ ] words  Correct/incorrect

142

| Manual rule | Event candidate |
|---|---|
| "Correct" when keyword "arthritis" exists within "five" words | Rheumatism |
| "Incorrect" when keyword "general" exists within "five" words | Other cancers |
| ... | ... |

| Rule ID | Manual rule | Event candidate |
|---|---|---|
| M1 | "Correct" when keyword "arthritis" exists within "five" words | Rheumatism |
| M2 | "Incorrect" when keyword "general" exists within "five" words | Other cancers |
| ... | ... | ... |

| Order | Word | Similarity |
|---|---|---|
| 1 | Neuropathy | 0.905459 |
| 2 | Edema | 0.900058 |
| 3 | Dermatitis | 0.897525 |
| 4 | Anemia | 0.894461 |
| 5 | Chronic | 0.892112 |
| ... | ... | ... |

FIG. 9

| Related word | Rule ID | Manual rule | Event candidate |
|---|---|---|---|
| Neuropathy | M1 | "Correct" when keyword "arthritis" exists within "five" words | Rheumatism |
| Edema | M1 | "Correct" when keyword "arthritis" exists within "five" words | Rheumatism |
| Dermatitis | M1 | "Correct" when keyword "arthritis" exists within "five" words | Rheumatism |

FIG. 10

| Rule ID | Automatic rule | Event candidate |
|---|---|---|
| A1 | "Correct" when keyword "neuropathy" exists within "five" words | Rheumatism |
| A2 | "Correct" when keyword "edema" exists within "five" words | Rheumatism |
| ... | ... | ... |

FIG. 11

| Event ID | Event candidate | Label | Rule ID |
|---|---|---|---|
| 2@14@120 | Rheumatism | Correct | M1 |
| 12-13@53@150 | Colorectal cancer | Correct | A11 |
| 1-2@14@120 | Chronic rheumatism | Correct | M3 |
| 16-17@41@160 | Other cancers | Incorrect | M2 |
| ... | ... | ... | ... |

FIG. 12

| Event ID | Event candidate | Label | Character |
|---|---|---|---|
| 2@14@120 | Rheumatism | Correct | (Arthritis, neuropathy, stenosis, ...) = (1, 0, 0, ...) |
| 12-13@53@150 | Colorectal cancer | Correct | (Arthritis, neuropathy, stenosis, ...) = (0, 0, 1, ...) |
| 1-2@14@120 | Chronic rheumatism | Correct | (Arthritis, neuropathy, stenosis, ...) = (1, 0, 0, ...) |
| 16-17@41@160 | Other cancers | Incorrect | (Arthritis, neuropathy, stenosis, ...) = (0, 0, 0, ...) |
| ... | ... | ... | ... |

F I G. 13

F I G. 14

F I G. 15

| Order | Word | Similarity |
|---|---|---|
| 1 | Stenosis | 0.873537 |
| 2 | Gastrointestinal bleeding | 0.872667 |
| 3 | Inflammatory disease | 0.864993 |
| 4 | Brain metastasis | 0.863223 |
| 5 | Bone metastasis | 0.860906 |
| ... | ... | ... |

F I G. 16

| Related word | Event content | Rule ID | Manual rule | Event candidate |
|---|---|---|---|---|
| Stenosis | Colorectal cancer | M1 | "Correct" when keyword "arthritis" exists within "five" words | Rheumatism |
| Gastrointestinal bleeding | Colorectal cancer | M1 | "Correct" when keyword "arthritis" exists within "five" words | Rheumatism |
| Inflammatory disease | Colorectal cancer | M1 | "Correct" when keyword "arthritis" exists within "five" words | Rheumatism |

F I G. 17

| Rule ID | Automatic rule | Event candidate |
|---|---|---|
| A11 | "Correct" when keyword "stenosis" exists within "five" words | Colorectal cancer |
| A12 | "Correct" when keyword "gastrointestinal bleeding" exists within "five" words | Colorectal cancer |
| ... | ... | ... |

F I G. 18

LEARNING APPARATUS, LEARNING METHOD, AND LEARNING PROGRAM

CROSS-REFERENCE TO RELATED APPLICATIONS

This application is based upon and claims the benefit of priority from prior Japanese Patent Application No. 2016-053038, filed Mar. 16, 2016, the entire contents of which are incorporated herein by reference.

FIELD

Embodiments described herein relate to a learning apparatus, a learning method, and a learning program.

BACKGROUND

In recent years, with the spread of computers and Internet environment, documents of various special fields have been electronicized and stored. For example, a large number of scholarly papers and patent documents are published in portal sites of scientific societies and patent search sites. Such documents enable acquisition of important knowledge in various special fields.

However, it is difficult for an individual and a group to continue to acquire information included in a large number of documents in a comprehensive manner. For example, in the case of acquiring comprehensive knowledge of a specific field, generally, documents are retrieved based on detailed information and words in such field, and a manual search is performed in the end. Because human resources used for such searches are limited, such searches depend on the resources of the individual or the group.

An extraction apparatus for automatically extracting a relationship of desired words in documents has been presented. The extraction apparatus learns relations between desired words using a label of the relation between words based on a known dictionary and similarity of feature values acquired from peripheral information of the words. It is supposed that the known dictionary is required to include knowledge of a certain quantity to properly estimate relationships between words. However, generation of a dictionary requires much cost due to the work involved, and there is a fear that a dictionary including knowledge of a sufficient quantity cannot be generated. Accordingly, it is desired to efficiently generate learning data relating to generation of a dictionary.

DETAILED DESCRIPTION

Embodiments will be explained hereinafter with reference to drawings. Hereinafter, elements that are the same as or similar to explained elements will be denoted by the same or similar reference numerals, and overlapping explanation thereof will be basically omitted.

A problem to be solved by embodiments is to provide a learning apparatus, a learning method, and a learning program that enable efficient generation of learning data used for machine learning.

The following embodiments illustrate an example of extracting disease names from documents to construct a comprehensive list of disease names as a knowledge base. An object for which a knowledge base is constructed is not limited to disease names, but may be terms relating to another special field.

The following embodiments use a method of distant supervision in which a large number of events are labelled according to a small number of rules, and learning is performed with the labels as supervisors.

In general, according to one embodiment, a learning apparatus includes an event candidate extractor, a first rule generator, a feature value calculator, a related word extractor, a second rule generator, a labeling unit, and a learning unit. The event candidate extractor configured to extract a word as an event candidate from a text in accordance with an extraction rule. The first rule generator configured to generate a first rule to label the event candidate, the first rule including a keyword of the event candidate. The feature value calculator configured to calculate feature values of other words included in the text other than the event candidate. The related word extractor configured to extract a related word relating to the keyword from the other words using the feature values. The second rule generator configured to generate a second rule to label the event candidate, the second rule being different from the first rule and including the related word. The labeling unit configured to label the event candidate using the first rule and the second rule. The learning unit configured to generate learning data associating the keyword, the related word, and the labeled event candidate with each other.

First Embodiment

Figure 1:
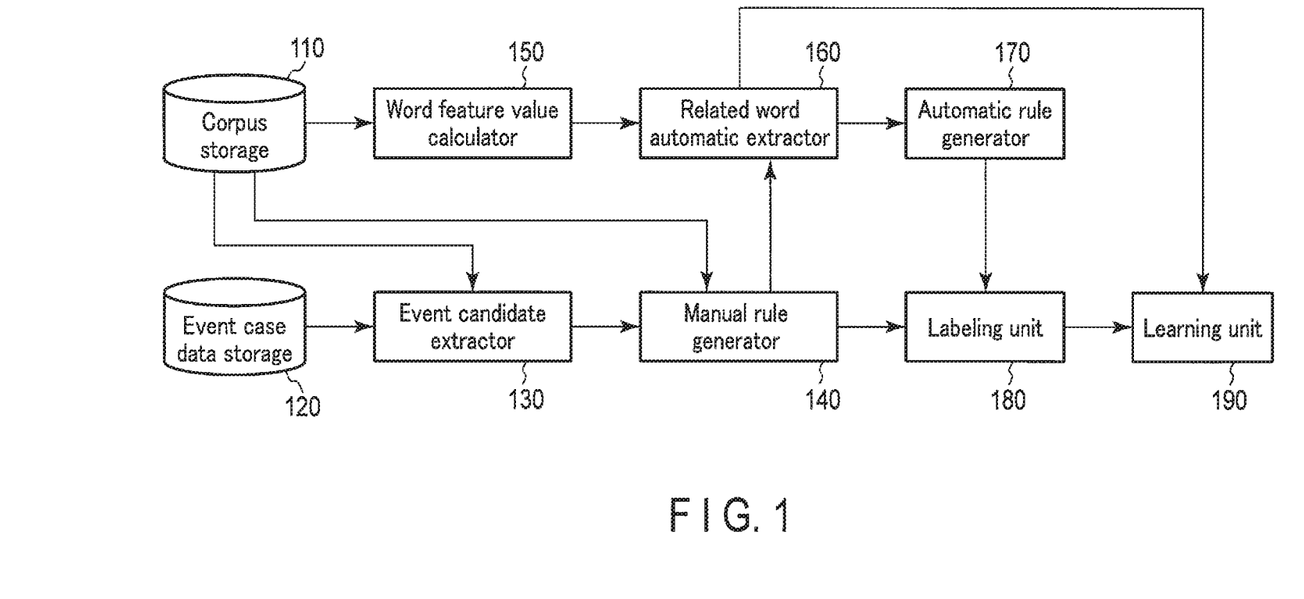
FIG. 1 is a diagram illustrating a learning apparatus according to a first embodiment.

As illustrated in FIG. 1, a learning apparatus according to the first embodiment includes a corpus storage 110, an event case data storage 120, an event candidate extractor 130, a manual rule generator 140 (first rule generator), a word feature value calculator 150 (feature value calculator), a related word automatic extractor 160 (related word extractor), an automatic rule generator 170 (second rule generator), a labeling unit 180, and a learning unit 190.

Figure 3:
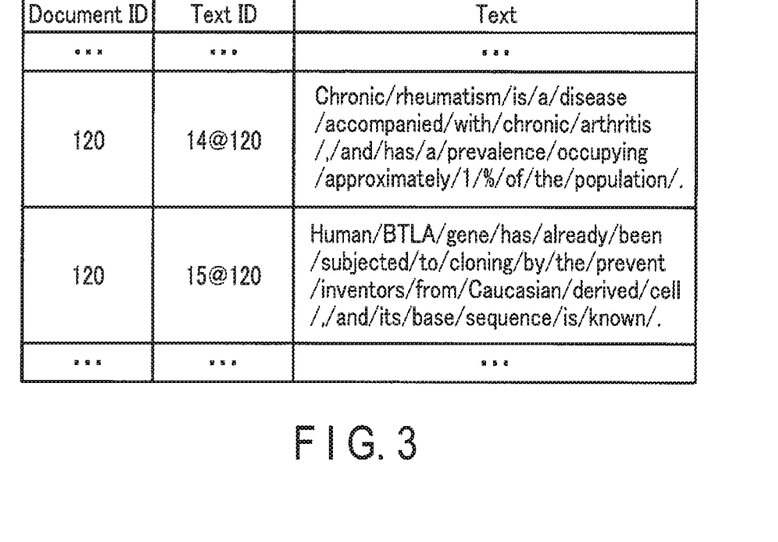
FIG. 3 is a diagram illustrating data stored in a corpus storage of FIG. 1.

The corpus storage 110 stores texts serving as analysis targets to construct a knowledge base. As illustrated in FIG. 3, the corpus storage 110 stores document IDs, text IDs, and texts that are respectively associated with each other. Each Document ID is an ID that uniquely identifies the document. Each text ID is an ID that uniquely identifies the text in the document. For example, the document ID "120" indicates the 120th document. The text ID "14@120" indicates the 14th text in the document of the document ID "120". The document IDs and the text IDs are not limited to the above example, but may be any IDs as long as they uniquely identify documents and texts. The text in the present embodiment may be divided in advance into morphemes with a word dictionary that is not illustrated.

The event case data storage 120 stores event case data in each of which event content (extraction rule) is associated with a method for extracting the event content. Each event content indicates a word (desired word) to be extracted from the texts stored in the corpus storage 110, and a regular expression rule of the word to be extracted from the texts.

Figure 4:
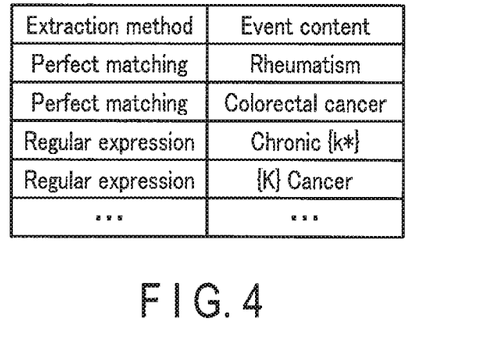
FIG. 4 is a diagram illustrating data stored in an event case data storage of FIG. 1.

FIG. 4 illustrates event case data. The extraction method "perfect matching" indicates extracting words matching the regular expression rule. As the regular expression rule, for example, a method using a wildcard may be used. Specifically, the sign "{k*}" in the regular expression rule indicates extracting a successive katakana character string of one or more characters. The sign "{K}" of the regular expression rule indicates extracting one Chinese character. In the present embodiment, because the purpose is extracting disease names, disease names and patterns of character strings that can be disease names are stored as the event contents.

The event case data can be generated in advance by, for example, the following method. When a list and a dictionary generated manually in advance exist, the user adds words included in the list and the dictionary as the extraction method "perfect matching" to the event case data. In the present embodiment, the user adds a list of disease names published on the web page or the like, for example, as the extraction method "perfect matching" to the event case data. In addition, the user can generate the regular expression rule as described above, to generate event case data that enables words other than words satisfying "perfect matching".

The event candidate extractor 130 reads a text from the corpus storage 110, and reads event case data from the event case data storage 120. The event candidate extractor 130 extracts words as event candidates from the text in accordance with the event contents (extraction rules). For example, with respect to the event content "rheumatism", the event candidate extractor 130 extracts the word "rheumatism" as an event candidate from the text of the text ID "14@120". The event candidate extractor 130 also extracts the word "chronic rheumatism" as an event candidate from the text of the text ID "14@120", with respect to the event content "chronic {k*}". The event candidate extractor 130 outputs the event candidates to the manual rule generator 140.

Figure 5:
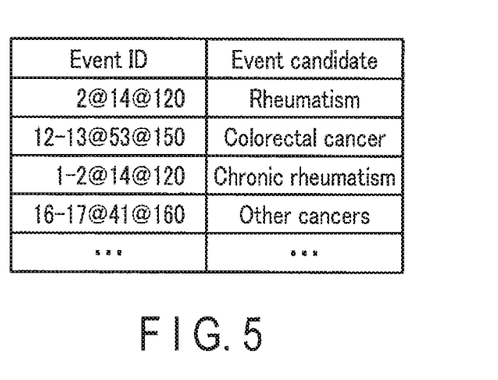
FIG. 5 is a diagram illustrating extraction results of an event candidate extractor of FIG. 1.

FIG. 5 illustrates extraction results including the extracted event candidates. Each event ID is an ID that uniquely identifies a word in the text. For example, the event ID "2@14@120" indicates the second word "rheumatism" in the sentence of the text ID "14@120". The event ID "12-13@53@150" indicates the 12th and 13th words "colorectal cancer" in the sentence of the text ID "53@150". The event ID may express a word that is divided into two or more words by morphological analysis, as one word.

The manual rule generator 140 reads the text from the corpus storage 110, and receives the event candidates from the event candidate extractor 130. The manual rule generator 140 generates manual rules (first rules) configured to label the event candidates, and each of the rules includes a keyword of an event candidate. For example, the manual rule generator 140 generates a manual rule "'correct' when the keyword 'arthritis' exists within 'five' words" including the keyword "arthritis" of the event candidate "rheumatism" included in the text (text ID "14@120". The manual rule generator 140 outputs pairs of manual rules and the event candidates as manual rule information to the related word automatic extractor 160 and the labeling unit 180.

Figure 6:
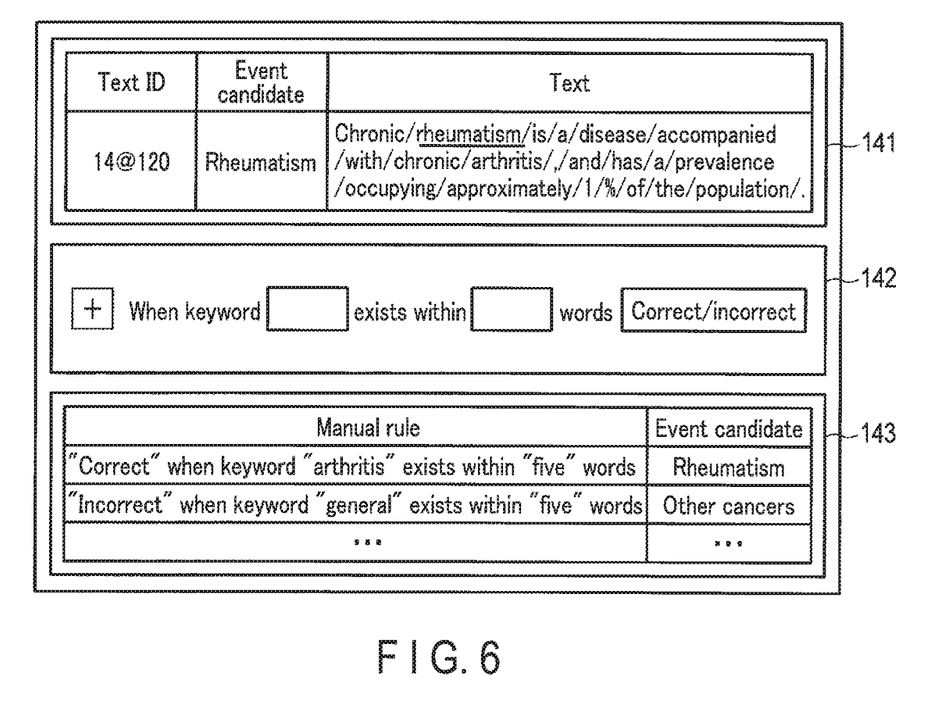
FIG. 6 is a diagram illustrating an interface of a manual rule generator of FIG. 1.

As the manual rule generator 140, the user may generate manual rules using the interface illustrated in FIG. 6. The interface illustrated in FIG. 6 includes an information presentation unit 141, a manual rule inputting unit 142, and a manual rule display 143.

The information presentation unit 141 displays the event candidate extracted by the event candidate extractor 130 and the text including the event candidate. With reference to the information presentation unit 141, the user is enabled to find the word ("arthritis") related to the event candidate "rheumatism" as a keyword.

The manual rule inputting unit 142 displays the interface to enable the user to generate a manual rule. For example, the user can generate a manual rule using the fixed-form rule "'correct/incorrect' when the keyword 'O' exists within 'O' words". The sign "correct/incorrect" indicates a label applied to each event candidate. The fixed-form rule can be generated by the user as desired.

The manual rule display 143 displays a list of manual rules generated by the user. The manual rule display 143 may enable modification of the generated manual rules by a user's operation.

Figure 7:
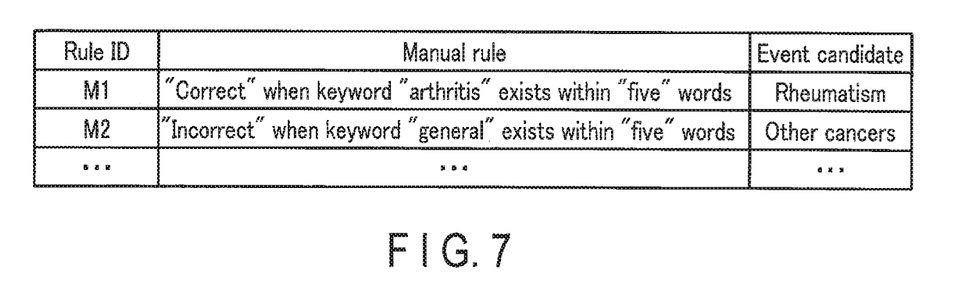
FIG. 7 is a diagram illustrating manual rule information.

FIG. 7 illustrates manual rule information. Each rule ID is an ID that uniquely identifies the manual rule generated in the manual rule generator 140. In FIG. 7, the rule ID "M2" indicates that the manual rule "'incorrect' when the keyword 'general' exists within 'five' words" is applied to the event candidate "other cancer".

The word feature value calculator 150 reads a text from the corpus storage 110. The word feature value calculator 150 calculates a feature value of a word included in the text. Specifically, the word feature value calculator 150 indicates a feature value of the word as a vector (word vector) of a continuous value using the context before and after the word included in the text. The word feature value calculator 150 outputs the word provided with the feature value (word vector) to the related word automatic extractor 160. The word feature value calculator 150 may calculate a feature value of a word other than the event candidate included in the text.

The word feature value calculator 150 indicates the word included in the text with a word vector of a continuous value using, for example, a Skip-gram model. The Skip-gram model enables expression of a word with a vector of a continuous value of the designated dimension using the context before and after the word in the text. The word feature value calculator 150 performs learning with the Skip-gram model, with the text of the corpus storage 110 used as the input, to indicate each word with a vector. In the present embodiment, the word vector has 100 dimensions, and the norm (magnitude) of the word vector is normalized to 1.

The related word automatic extractor 160 receives manual rule information from the manual rule generator 140, and receives the words provided with feature values (word vectors) from the word feature value calculator 150. The related word automatic extractor 160 extracts related words relating to the keyword from the words included in the text. Specifically, the related word automatic extractor 160 extracts words with high similarities between the keyword and the word included in the text as related words. The related word automatic extractor 160 outputs pairs of the related words and manual rule information as related word information to the automatic rule generator 170. The related word automatic extractor 160 outputs the extracted related words to the learning unit 190. The related word automatic extractor 160 may extract related words relating to the keyword from other words than the event candidates included in the text using the feature value.

Figure 8:
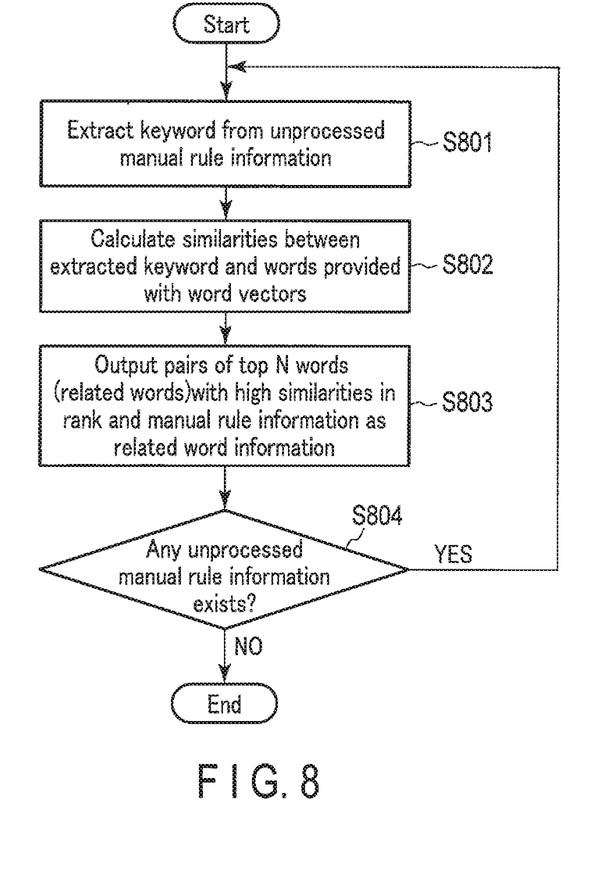
FIG. 8 is a flowchart illustrating operations of a related word automatic extractor of FIG. 1.

The related word automatic extractor 160 operates as illustrated in FIG. 8. The related word automatic extractor 160 extracts a keyword from the unprocessed manual rule information (Step S801).

At Step S802, the related word automatic extractor 160 calculates similarity between the extracted keyword and the word provided with a word vector. The similarity may be calculated with, for example, the following Numerical Expression (1) using a cosine distance.

$$\bar{v}_c \cdot \bar{v}_w \quad (1)$$

In Numerical Expression (1) described above, the vector $v_c$ indicates a word vector of the keyword c, and the vector $v_w$ indicates a word vector of the word w. A value of Numerical Expression (1) closer to 1 indicates higher similarity between the keyword c and the word w.

At Step S803, the related word automatic extractor 160 outputs pairs of top N words (related words) with high similarities in rank and manual rule information as related word information.

At Step S804, the related word automatic extractor 160 determines whether any unprocessed manual rule information exists. When any unprocessed manual rule information exists, the process returns to Step S801. If no unprocessed manual rule information exists, the process is ended.

Figure 9:
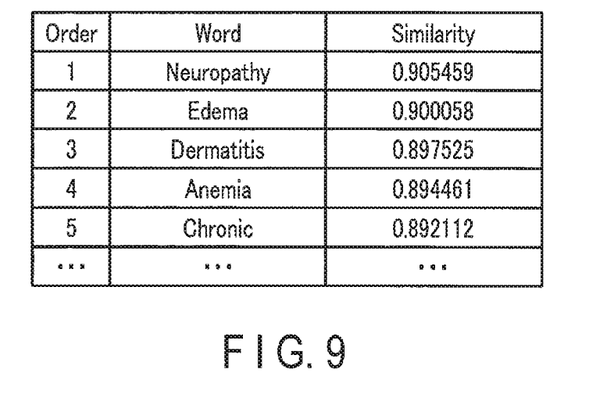
FIG. 9 is a diagram illustrating extraction results of related words.

FIG. 9 illustrates extraction results of related words. FIG. 9 illustrates a list of words (such as "neuropathy" and "edema") with high similarities with the keyword ("arthritis"). The words with high similarities indicate words that can be a keyword for the event candidate "rheumatism".

Figure 10:
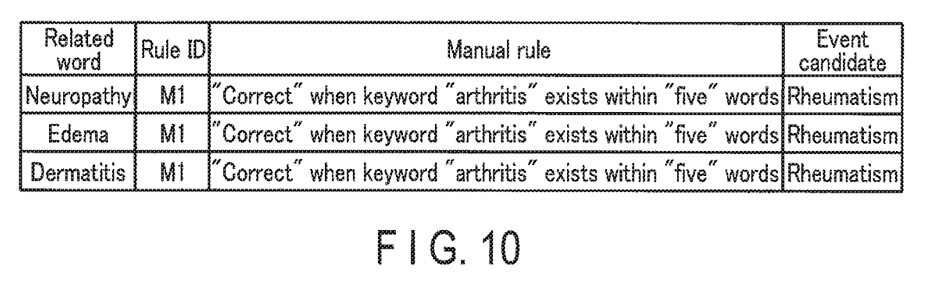
FIG. 10 is a diagram illustrating related word information.

FIG. 10 illustrates related word information. FIG. 10 illustrates pairs of related words with high similarities with the keyword "arthritis" and the rule ID "M1".

The automatic rule generator 170 receives related word information from the related word automatic extractor 160. The automatic rule generator 170 generates automatic rules (second rules) to label the event candidates including the keyword of the event candidate. For example, the automatic rule generator 170 generates an automatic rule "'correct' when the keyword 'neuropathy' exists within 'five' words", by replacing the keyword "arthritis" by the related word "neuropathy". The automatic rule generator 170 outputs the pairs of the automatic rules and the event candidates as automatic rule information to the labeling unit 180. The method for generating the automatic rules is not limited to replacing the keyword by the related word, but may be a method of changing the number of characters between the event candidate and the keyword or the type of the label.

Figure 11:
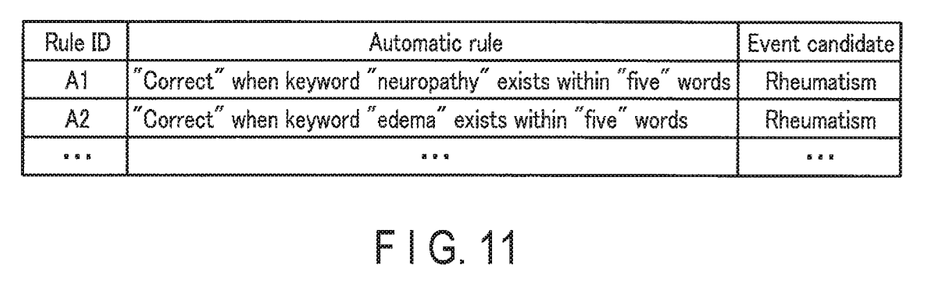
FIG. 11 is a diagram illustrating automatic rule information.

FIG. 11 illustrates the automatic rule information. In FIG. 11, the rule ID "A1" indicates that the automatic rule "'correct' when the keyword 'neuropathy' exists within 'five' words" is applied to the event candidate "rheumatism".

The labeling unit 180 receives manual rule information from the manual rule generator 140, and receives automatic rule information from the automatic rule generator 170. The labeling unit 180 labels the event candidates using the manual rules and the automatic rules. For example, the labeling unit 180 applies the label "correct" to the event candidate "rheumatism" according to the manual rule "'correct' when the keyword 'arthritis' exists within 'five' words" of the rule ID "M1". The labeling unit 180 outputs the labeled event candidates obtained by labeling the event candidates and the rule IDs of the rules serving as the grounds for labeling to the learning unit 190.

Figure 12:
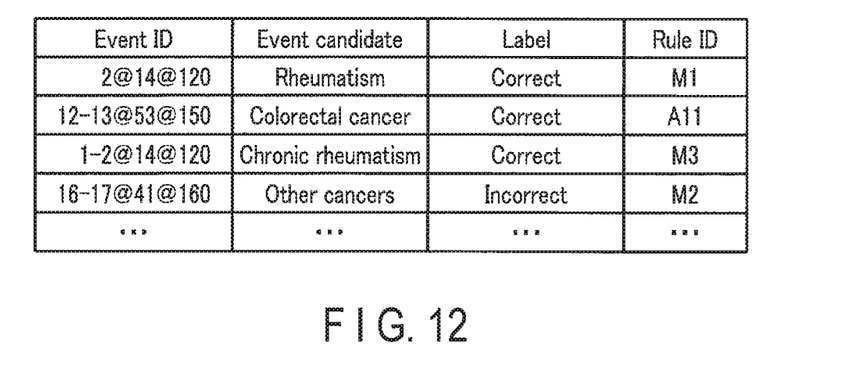
FIG. 12 is a diagram illustrating labelled event candidates.

FIG. 12 illustrates the labeled event candidates obtained by labeling the event candidates. In FIG. 12, the event ID "1-2@14@120" indicates that the event candidate "chronic rheumatism" is labeled "correct" according to the rule ID "M3".

The learning unit 190 receives the related words from the related word automatic extractor 160, and receives the labeled event candidates and the rule IDs from the labeling unit 180. The learning unit 190 generates learning data associating the keyword included in the rule, the related word, and the labeled event candidate with each other. Specifically, the learning unit 190 generates learning data by associating the feature value indicating whether the keyword and the related word exist in the text including the event candidate with the event candidate.

Figure 13:
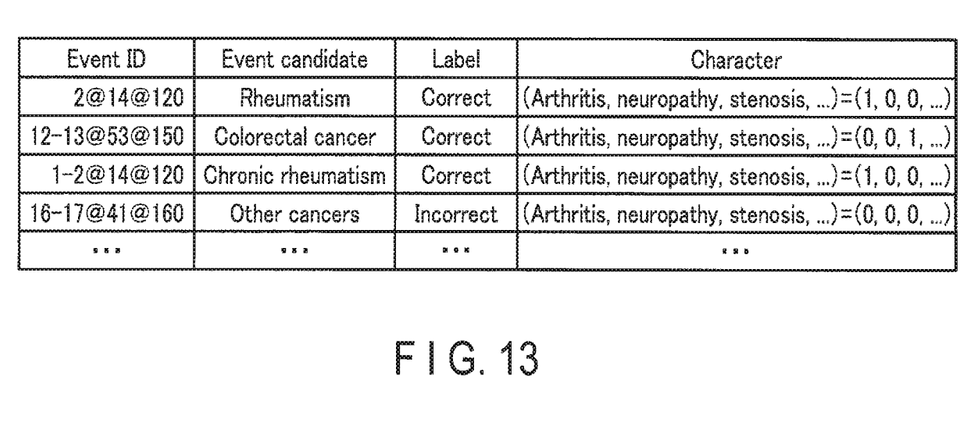
FIG. 13 is a diagram illustrating conversion of event candidates into learning data.

FIG. 13 illustrates learning data. In FIG. 13, whether the keyword and the related word are included in the text including the event candidate is expressed as the feature value "1" or "0". For example, with respect to the event candidate "rheumatism" (the event ID "2@14@120"), the feature value of the "arthritis" is "1" because the word "arthritis" is included in the text (text ID "14@120"), and the feature values of the words "neuropathy" and "stenosis" are "0" because neither the word "neuropathy" nor the word "stenosis" are included in the text. The feature value may be the words before and after the event candidate, or the character type of the event candidate.

The learning unit 190 may learn the classification model by an ordinary supervised machine learning method using the learning data described above. The learning method may be, for example, SVM (Support Vector Machine) of a soft margin resistant to label noise.

The learning apparatus according to the first embodiment enables labeling of event candidates that are not labelled, using the above classification model. In the present embodiment, a comprehensive list of disease names is generated by, for example, extracting the event candidates labelled "correct" as final disease names.

Figure 2:
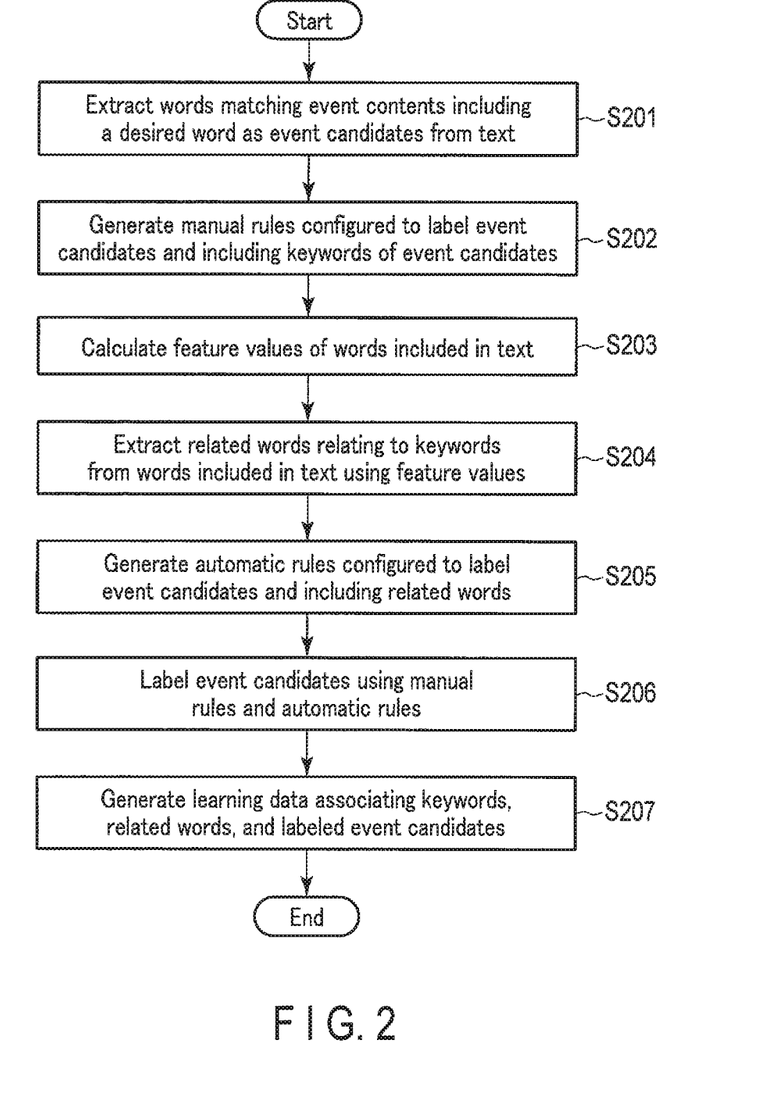
FIG. 2 is a flowchart illustrating operations of the learning apparatus of FIG. 1.

When the explanations described above are put together, the learning apparatus according to the first embodiment operates as illustrated in FIG. 2.

At Step S201, the event candidate extractor 130 extracts words corresponding to the event content including a desired word from the text as event candidates.

At Step S202, the manual rule generator 140 generates manual rules (first rules) configured to label the event candidates and including the keywords of the event candidates.

At Step S203, the word feature value calculator 150 calculates feature values of the words included in the text.

At Step S204, the related word automatic extractor 160 extracts related words relating to the keywords from the words included in the text using the feature values.

At Step S205, the automatic rule generator 170 generates automatic rules (second rules) configured to label the event candidates and including related words.

At Step S206, the labeling unit 180 labels the event candidates using the manual rules and the automatic rules.

At Step S207, the learning unit 190 generates learning data associating the keywords, the related words, and the labeled event candidates with each other.

As described above, the learning apparatus according to the first embodiment generates manual rules to label the event candidates extracted from the text, generates automatic rules by replacing the keywords of the manual rules by the related words, and labels the event candidates using the manual rules and the automatic rules. In addition, the learning apparatus is capable of generating learning data using the labeled event candidates, and learning the classification model using the learning data. Specifically, the learning apparatus enables efficient generation of learning data used for machine learning.

Second Embodiment

In the learning apparatus according to the first embodiment, related words are extracted based on similarities between the keywords and the words included in the text. By contrast, in the learning apparatus according to the second embodiment, related words may be extracted based on similarities between relationships of the keywords to the event candidates and relationships between the words included in the text to the event contents.

Figure 14:
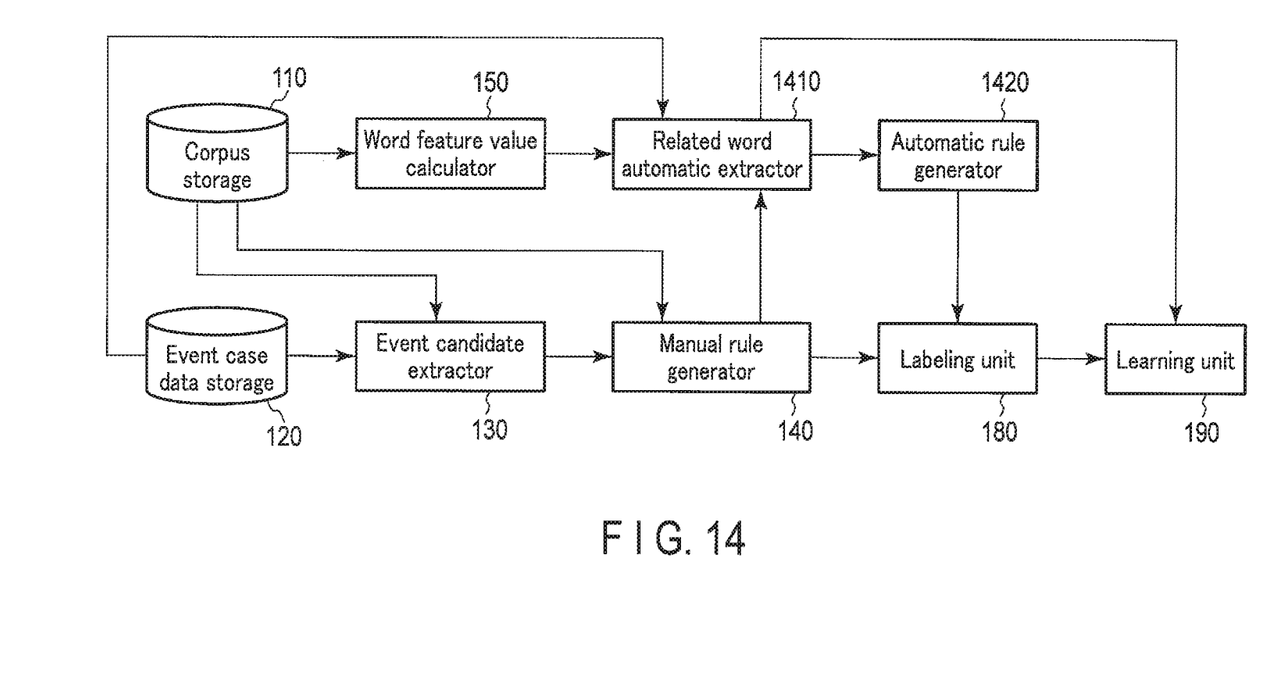
FIG. 14 is a diagram illustrating a learning apparatus according to a second embodiment.

As illustrated in FIG. 14, the learning apparatus according to the second embodiment includes a corpus storage 110, an event case data storage 120, an event candidate extractor 130, a manual rule generator 140 (first rule generator), a word feature value calculator 150, a labeling unit 180, a learning unit 190, a related word automatic extractor 1410, and an automatic rule generator 1420 (second rule generator). The following is explanation of the related word automatic extractor 1410 and the automatic rule generator 1420 that perform specific operations different from those of the learning apparatus according to the first embodiment. The related word automatic extractor 1410 and the automatic rule generator 1420 may include operations of the related word automatic extractor 160 and operations of the automatic rule generator 170, respectively, according to the first embodiment.

The related word automatic generator 1410 reads event case data from the event case data storage 120, receives manual rule information from the manual rule generator 140, and receives words provided with feature values (word vectors) from the word feature value calculator 150. The related word automatic extractor 1410 extracts related words with high relevance to the keywords from the words included in the text. Specifically, the related word automatic extractor 1410 extracts words, each having a high similarity in the relationship between the keyword and the event candidate, and the relationship between the word included in the text and the event content, as related words. The related word automatic extractor 1410 outputs combinations of the manual rule information, the related words, and the event contents as related word information to the automatic rule generator 1420. The related word automatic extractor 1410 also outputs the extracted related words to the learning unit 190.

Figure 15:
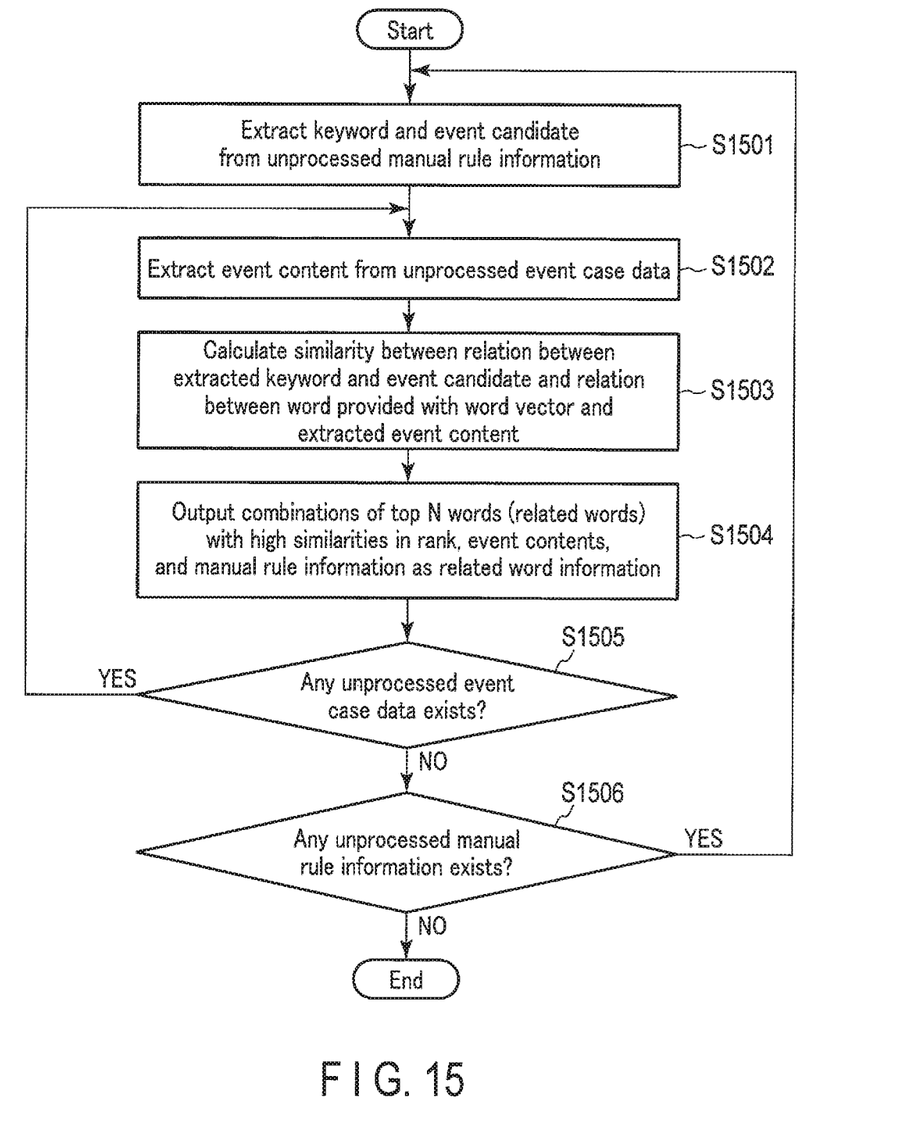
FIG. 15 is a flowchart illustrating operations of a related word automatic extractor of FIG. 14.

The related word automatic extractor 1410 operates as illustrated in FIG. 15. The related word automatic extractor 1410 extracts keywords and event candidates from unprocessed manual rule information (Step S1501).

At Step S1502, the related word automatic extractor 1410 extracts event contents from unprocessed event case data. In the present embodiment, the event content does not include regular expression rules.

At Step S1503, the related word automatic extractor 1410 calculates each similarity between a relation between the extracted keyword and the event candidate and a relation between the word provided with the word vector and the extracted event content. The similarity may be calculated with, for example, the following Numerical Expression (2).

$$(\overline{v}_c - \overline{v}_b) \cdot (\overline{v}_w - \overline{v}_j) \quad (2)$$

In Numerical Expression (2) described above, the vector $v_b$ indicates a word vector of the event candidate b, and the vector $v_j$ indicates a word vector of the event content j. A value of Numerical Expression (2) closer to 1 indicates higher similarity between the relation between the keyword c and the event candidate b and the relation between the word w and the event content j.

At Step S1504, the related word automatic extractor 1410 outputs combinations of the top N words (related words) with high similarities in rank, the event content and manual rule information as related word information. The related words of high similarities in rank are not necessarily output as the related word information. At Step S1505, the related word automatic extractor 1410 determines whether any unprocessed event case data exists. When any unprocessed event case data exists, the process returns to Step S1502. When no unprocessed event case data exists, the process goes to Step S1506.

At Step S1506, the related word automatic extractor 1410 determines whether any unprocessed manual rule information exists. When any unprocessed manual rule information exists, the process returns to Step S1501. When no unprocessed manual rule information exists, the process is ended.

The automatic rule generator 1420 receives related word information from the related word automatic extractor 1410. The automatic rule generator 1420 generates automatic rules (second rules) to label the event contents serving as event candidates using the related words, the event contents, and the manual rules. For example, the automatic rule generator 1420 generates the automatic rule "'correct' when the keyword 'stenosis' exists within 'five' words" relating to the event candidate "colorectal cancer", by replacing the keyword "arthritis" by the related word "stenosis", and replacing the event candidate "rheumatism" by the event content "colorectal cancer".

Figure 16:
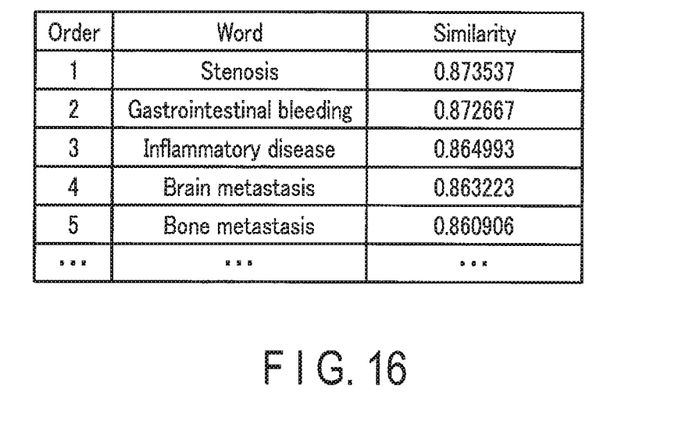
FIG. 16 is a diagram illustrating extraction results of related words.

FIG. 16 illustrates extraction results of related words relating to the event content "colorectal cancer". FIG. 16 illustrates a list of words in relations (that is, relation between the word (such as "stenosis" and "gastrointestinal bleeding") and the event content "colorectal cancer") with high similarities to the relations between the keyword "arthritis" and the event candidate "rheumatism". Words having any relation to the event content "colorectal cancer" are indicated as the words with high similarities. In the present embodiment, the word "arthritis" is related to "rheumatism" because "arthritis" serves as "symptoms" of "rheumatism". In the same manner, for example, the word "stenosis" is related to "colorectal cancer" because "stenosis" serves as "symptoms" of "colorectal cancer".

Figure 17:
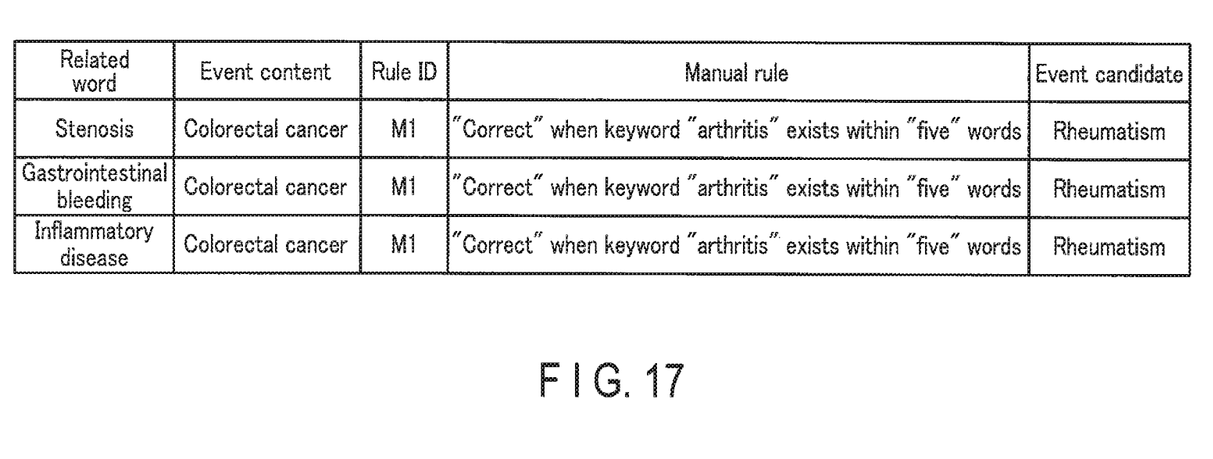
FIG. 17 is diagram illustrating related word information.

FIG. 17 illustrates related word information. FIG. 17 illustrates combinations of the relations (the related words "stenosis", "gastrointestinal bleeding", and "inflammatory disease" and the event content "colorectal cancer") with high similarities with the relation between the keyword "arthritis" and the event candidate "rheumatism" and the rule ID "M1".

Figure 18:
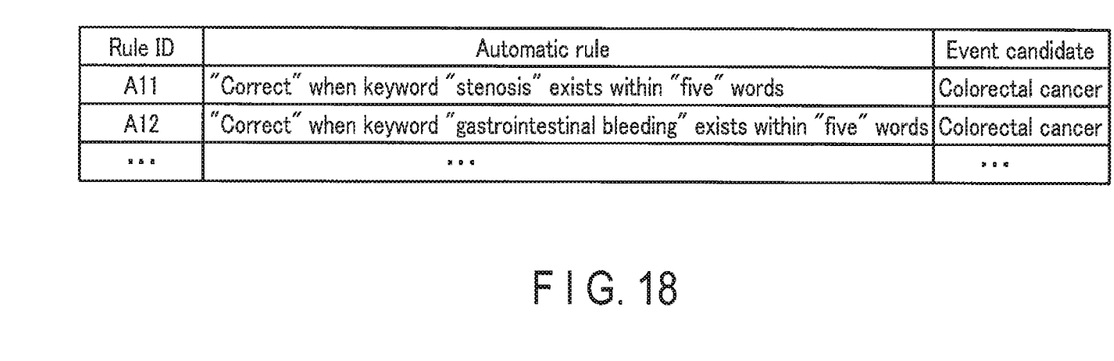
FIG. 18 is a diagram illustrating automatic rule information.

FIG. 18 illustrates automatic rule information. In FIG. 18, the rule ID "A11" indicates that the automatic rule "'correct' when the keyword 'stenosis' exists within 'five' words" is applied to the event candidate "colorectal cancer".

As explained above, the learning apparatus according to the second embodiment is different in operations of the related word automatic extractor and the automatic rule generator. The learning apparatus is capable of extracting a relation between unknown words from a relation between known words. Accordingly, the learning apparatus enables efficient generation of learning data used for machine learning.

The instructions illustrated in the processing procedures illustrated in the embodiments described above can be executed based on a program serving as software. The same effects as the effects of the learning apparatuses of the embodiments described above can be obtained with a general-purpose computer system storing the program in advance and reading the program.

The instructions described in the embodiments described above are recorded in a magnetic disk (such as a flexible disk and a hard disk), an optical disk (such as a CD-ROM, a CD-R, a CD-RW, a DVD-ROM, a DVD±R, and a DVD±RW), a semiconductor memory, or a recording medium similar to them, as a program that can be executed by a computer. The storage form may be any form, as long as it is a recording medium readable by a computer or an incorporated system. The computer can achieve operations similar to those of the learning apparatuses of the embodiments described above, by reading the program from the recording medium and executing the instructions described in the program on the CPU based on the program. As a matter of course, when the computer acquires or reads the program, the computer may acquire or read the program through a network.

Part of the processes to achieve the present embodiment may be executed by an OS (operating system), database management software, or MW (middleware) such as a network, which operates on the computer based on instructions of the program installed from the recording medium in the computer or the incorporated system.

The recording medium in the present embodiment is not limited to a medium independent of the computer or the incorporated system, but also includes a recording medium that stores or temporarily stores a downloaded program transmitted through a LAN or the Internet or the like.

The recording medium is not limited to one, and the recording medium in the present embodiment also includes the case of executing the process in the present embodiment from a plurality of recording media. The recording medium may have any structure.

The computer in the present embodiment is not limited to a personal computer, and also includes an arithmetic processing unit included in an information processing apparatus, a multi-functional mobile phone, and a microcomputer, and serves as a general term for apparatuses and devices capable of achieving the functions in the present embodiment with a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising processing circuitry coupled to a memory, the processing circuitry configured to:
   extract a word as an event candidate from a text in accordance with an extraction rule;
   input a first rule generated by a user, the first rule including a first relation between the event candidate and a keyword of the event candidate, the first rule being used to label the event candidate in accordance with the first relation;
   calculate feature values of other words included in the text other than the event candidate using a first vector indicating the first relation and a second vector indicating a relation between one of the other words and a desired word used for the extraction rule, the first vector being calculated by subtracting an event candidate vector of the event candidate from a keyword vector of the keyword, and the second vector being calculated by subtracting a desired word vector of the desired word from a word vector of the one of the other word;
   extract a related word relating to the keyword from the other words using the feature values;
   generate a second rule by replacing the keyword in the first rule by the related word, the second rule including a second relation between the event candidate and the related word, the second rule being used to label the event candidate in accordance with the second relation;
   label the event candidate using the first rule and the second rule; and
   generate learning data associating the keyword, the related word, and the labeled event candidate with each other and learn a classification model using the labeled event candidates in the learning data as supervisors;
   wherein the extracting the related word further extracts a particular number of words from the other words as related words using the feature values.

2. The apparatus according to claim 1, wherein the calculating the feature values indicates each of the feature values as a vector of a continuous value using context before and after the word included in the text.

3. The apparatus according to claim 1, wherein the extracting the related word extracts a word with a high similarity between the keyword and the other words as the related word.

4. The apparatus according to claim 1, wherein each of the particular number of words extracted from the other words has a high similarity between the first vector and the second vector.

5. The apparatus according to claim 4, wherein the generating the second rule further generates the second rule to label a word matching the desired word serving as the event candidate, using the first rule, the related word, and the desired word.

6. The apparatus according to claim 4, wherein the memory is configured to store the desired word.

7. The apparatus according to claim 5, wherein the memory is configured to store the desired word.

8. The apparatus according to claim 1, wherein the memory is configured to store the text.

9. A learning method comprising:
   extracting a word as an event candidate from a text in accordance with an extraction rule; input a first rule generated by a user, the first rule including a first relation between the event candidate and a keyword of the event candidate, the first rule being used to label the event candidate in accordance with the first relation;
   calculating feature values of other words included in the text other than the event candidate using a first vector indicating the first relation and a second vector indicating a relation between one of the other words and a desired word used for the extraction rule, the first vector being calculated by subtracting an event candidate vector of the event candidate from a keyword vector of the keyword, and the second vector being calculated by subtracting a desired word vector of the desired word from a word vector of the one of the other word;
   extracting a related word relating to the keyword from the other words using the feature values;
   generating a second rule by replacing the keyword in the first rule by the related word, the second rule including a second relation between the event candidate and the related word, the second rule being used to label the event candidate in accordance with the second relation;
   labeling the event candidate using the first rule and the second rule; and
   generating learning data associating the keyword, the related word, and the labeled event candidate with each other and learning a classification model using the labeled event candidates in the learning data as supervisors;
wherein the extracting the related word further extracts a particular number of words from the other words as related words using the feature values.

10. A non-transitory computer readable medium storing a computer program which is executed by a computer to provide the steps of:
   extracting a word as an event candidate from a text in accordance with an extraction rule;
   input a first rule generated by a user, the first rule including a first relation between the event candidate and a keyword of the event candidate, the first rule being used to label the event candidate in accordance with the first relation;
   calculating feature values of other words included in the text other than the event candidate using a first vector indicating the first relation and a second vector indicating a relation between one of the other words and a desired word used for the extraction rule, the first vector being calculated by subtracting an event candidate vector of the event candidate from a keyword vector of the keyword, and the second vector being calculated by subtracting a desired word vector of the desired word from a word vector of the one of the other word;
   extracting a related word relating to the keyword from the other words using the feature values;
   generating a second rule by replacing the keyword in the first rule by the related word, the second rule including a second relation between the event candidate and the related word, the second rule being used to label the event candidate in accordance with the second relation;
   labeling the event candidate using the first rule and the second rule; and
   generating learning data associating the keyword, the related word, and the labeled event candidate with each other and learning a classification model using the labeled event candidates in the learning data as supervisors;
   wherein the extracting the related word further extracts a particular number of words from the other words as related words using the feature values.

* * * * *